(12) United States Patent
Graham et al.

(10) Patent No.: US 9,912,772 B2
(45) Date of Patent: *Mar. 6, 2018

(54) SOCIAL MODE FOR MANAGING COMMUNICATIONS BETWEEN A MOBILE DEVICE AND A SOCIAL NETWORKING SYSTEM

(71) Applicant: Facebook, Inc., Menlo Park, CA (US)

(72) Inventors: Mary Graham, San Francisco, CA (US); Erick Tseng, San Francisco, CA (US); Chamath M. Palihapitiya, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 14/506,604

(22) Filed: Oct. 4, 2014

(65) Prior Publication Data
US 2015/0026234 A1     Jan. 22, 2015

Related U.S. Application Data

(63) Continuation of application No. 13/164,210, filed on Jun. 20, 2011, now Pat. No. 8,880,640.

(51) Int. Cl.
| | |
|---|---|
| *H04L 29/08* | (2006.01) |
| *H04W 8/18* | (2009.01) |
| *H04W 4/02* | (2009.01) |
| *G06Q 50/00* | (2012.01) |

(52) U.S. Cl.
CPC ............ *H04L 67/26* (2013.01); *G06Q 50/01* (2013.01); *H04L 67/02* (2013.01); *H04L 67/18* (2013.01); *H04W 4/023* (2013.01); *H04W 8/18* (2013.01)

(58) Field of Classification Search
CPC ......... G06Q 50/01; H04L 67/02; H04L 67/26; H04L 67/18; H04W 8/18; H04W 4/023
See application file for complete search history.

(56) References Cited

U.S. PATENT DOCUMENTS

| | | | |
|---|---|---|---|
| 6,272,467 B1 * | 8/2001 | Durand ................. | G06Q 10/02 705/26.1 |
| 2005/0216550 A1 | 9/2005 | Paseman et al. | |

(Continued)

OTHER PUBLICATIONS

PCT International Search Report and Written Opinion, PCT Application No. PCT/US2012/040960, dated Aug. 28, 2012, eight pages.

(Continued)

*Primary Examiner* — Abdullahi E Salad
(74) *Attorney, Agent, or Firm* — Fenwick & West LLP

(57) ABSTRACT

The automatic transmission of communications between a mobile device and a social networking system is regulated based on the communication mode of the mobile device. A communication for transmission between the mobile device and the social networking system is detected. A communication switch setting, such as a switch position, is determined for the mobile device. A communication mode for the mobile device is determined based on the communication switch setting. For example, if the switch is in a first position, the mobile device is determined to be in a social mode. Likewise, if the switch is in a second position, the mobile device is determined to be a manual mode. If the mobile device is in the social mode, the communication is automatically transmitted. If the mobile device is in the manual mode, the communication is transmitted only in response to authorization from the user of the mobile device.

28 Claims, 3 Drawing Sheets

(56) References Cited

U.S. PATENT DOCUMENTS

| | | | |
|---|---|---|---|
| 2005/0227676 A1* | 10/2005 | De Vries | H04L 12/5895 |
| | | | 455/414.1 |
| 2006/0287919 A1* | 12/2006 | Rubens | G06F 17/30864 |
| | | | 705/14.53 |
| 2008/0291022 A1* | 11/2008 | Amador | G06Q 30/02 |
| | | | 340/572.1 |
| 2009/0089804 A1 | 4/2009 | Beadle et al. | |
| 2009/0137256 A1* | 5/2009 | Karaoguz | G01S 13/878 |
| | | | 455/456.6 |
| 2010/0016003 A1 | 1/2010 | Shapiro et al. | |
| 2010/0216509 A1 | 8/2010 | Riemer et al. | |
| 2010/0227594 A1 | 9/2010 | De Vries | |
| 2010/0228590 A1 | 9/2010 | Muller et al. | |
| 2010/0240402 A1* | 9/2010 | Wickman | H04M 1/57 |
| | | | 455/466 |
| 2011/0029598 A1 | 2/2011 | Arnold et al. | |
| 2011/0116616 A1 | 5/2011 | Selph et al. | |
| 2011/0117897 A1 | 5/2011 | Lee et al. | |
| 2011/0231493 A1* | 9/2011 | Dyor | G06Q 10/0631 |
| | | | 709/206 |

OTHER PUBLICATIONS

United States Office Action, U.S. Appl. No. 13/164,210, dated Apr. 11, 2014, fifteen pages.

United States Office Action, U.S. Appl. No. 13/164,210, dated Aug. 19, 2013, fourteen pages.

* cited by examiner

SOCIAL MODE FOR MANAGING COMMUNICATIONS BETWEEN A MOBILE DEVICE AND A SOCIAL NETWORKING SYSTEM

CROSS-REFERENCE TO RELATED APPLICATION

This application is a continuation of co-pending U.S. application Ser. No. 13/164,210, filed Jun. 20, 2011, which is incorporated by reference in its entirety.

BACKGROUND

This invention relates generally to social networking, and in particular to providing a hardware switch that manages automatic and manual communication between a mobile device and a social networking system.

Social networking systems commonly provide mechanisms allowing users to interact with the social networking system using a mobile device, such as a mobile phone. The user of a mobile device may interact with the social networking system in various ways, both by receiving communications from the social networking system and transmitting communications to the social networking system. "Communications" as used herein refers to any type of information sent between the mobile device and social networking system. Examples of communications include photographs, location information, phone calls, text messages, email messages, mobile device application data and notifications.

Mobile devices may automatically receive communications from a social networking system. For example, a social networking system may transmit a message to a mobile device from a friend of the user of the mobile device without any explicit action by the user of the mobile device. Likewise, a social networking system may automatically transmit a notification to the user of a mobile device indicating that it is the user's turn in a social networking system game. Mobile devices may also automatically transmit communications to a social networking system. For example, a mobile device may have location-detection functionality, and may be set to transmit the location of the user of the mobile device to the social networking system without explicit action by the user of the mobile device. Likewise, a mobile device may automatically transmit photographs taken by the mobile device to the social networking system.

The automatic transmission of communications between a mobile device and a social networking system provides an efficient way to transfer information by minimizing the amount of input required by a user of the mobile device. Automatically transmitting communications is not always ideal, however, as user may want to prevent the transmission of certain communications to and from a social networking system. For instance, a user concerned with privacy may want to prevent the transmission of certain location information to the social networking system. Likewise, a user who wants to minimize interruptions may want to prevent the reception of certain notifications from the social networking system. Thus, a solution is needed that allows a mobile device user to efficiently switch between a communication mode that allows one or more types of automatic communications to and from a social networking system ("social mode") and a communication mode that requires user authorization for communications to and from a social networking system ("manual mode").

SUMMARY

Embodiments of the invention provide communication management between a mobile device and a social networking environment. A mobile device communication mode switch allows a user of the mobile device to operate the mobile device in one of two or more communication modes. Communications are transmitted between the mobile device and the social networking environment based on the communication mode of the mobile device. In a first communication mode, communications may be automatically transmitted between the mobile device and the social networking environment. In a second communication mode, communications may be transmitted between the mobile device and the social networking environment only in response to receiving authorization for the transmission from the user of the mobile device.

The communications for transmission may be any type of information transmitted between the mobile device and the social networking environment. For example, the communications may be email messages, instant messages, photographs or other images, videos, location information or phone calls. The communication mode switch may be a hardware switch protruding from the mobile device, or may be any other type of switch. In one embodiment, a communication may be transmitted in response to an action performed on the mobile device, such as the capturing of an image by the mobile device or the determining of the location of the mobile device by the mobile device.

Figure 1:
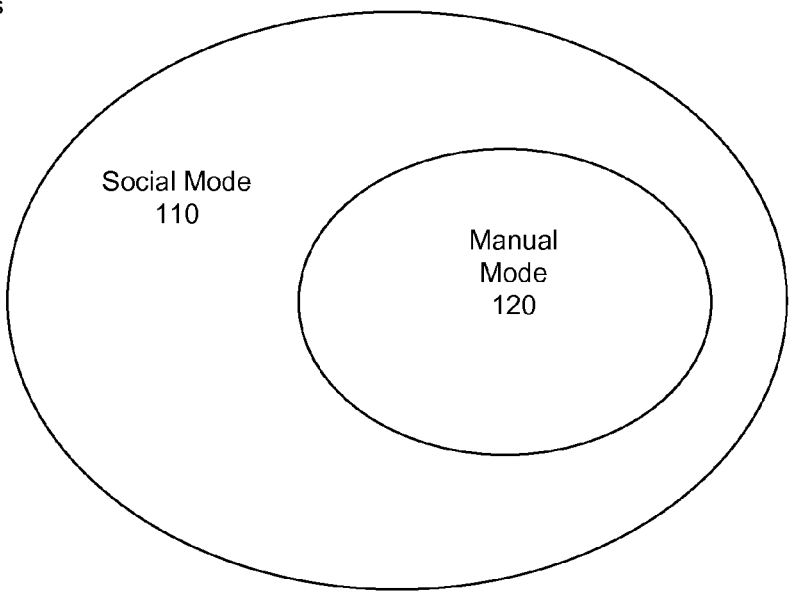
FIG. 1 is a diagram illustrating the relative automatic transmission of communications in various mobile device operating modes, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system user may be an individual or any other entity, such as a business or other non-person entity. Social networking systems allowing users to create, upload, display and share information within the context of the social networking system. Social networking system information includes biographical user information, user preferences, and content items. Content items may be anything that a social networking system user may create, upload, edit, share, post or interact with, such as messages, queued messages (e.g., email), text and SMS (short message service) messages, comment messages, messages sent using any other suitable messaging technique, an HTTP link, HTML files, images, videos, audio clips, documents, document edits, calendar entries or events, and other computer-related files. Content items may be uploaded to or created within many social networking system contexts, such as user profiles, user walls, group pages, private messages, email messages, photo albums, or any other social networking system context capable of displaying a content item. Collectively, social networking system contexts capable of displaying a content item are referred to as "spaces". Administrators of a space are referred to as the "owners" of the space. Creating or uploading a content item to a space is referred to as "posting" to the space.

Social networking systems commonly provide mechanisms allowing users to interact with objects and other users both within and external to the context of the social networking system. The social networking system may utilize a web-based interface comprising a series of inter-connected pages displaying and allowing users to interact with social networking system objects and information. For example, a social networking system may display a page for each social networking system user including objects and information entered by or related to the social networking system user (the user's "profile"). Social networking systems may also contain pages containing pictures or videos, dedicated to concepts, dedicated to users with similar interests ("groups"), or containing communications or social networking system activity to, from or by other users. Social networking system pages may contain links to other social networking system pages, and may include additional capabilities such as search, real-time communication, content-item uploading, purchasing, advertising, and any other web-based technology or ability. It should be noted that a social networking system interface may be accessible from a web browser or a non-web browser application, such as a dedicated social networking system mobile device or computer application. Accordingly, "page" as used herein may be a web page, an application interface or display, a widget displayed over a web page or application, a box or other graphical interface, an overlay window on another page (whether within or outside the context of a social networking system), or a web page external to the social networking system with a social networking system plug in or integration capabilities.

Online social networking systems allow users to associate themselves and establish connections with other users of the social networking system. When two users establish a connection, they become "friends" (or, "connections") within the context of the social networking system. Being friends in a social networking system may allow users access to more information about each other than would otherwise be available to unconnected users. For instance, being friends may allow a user to view another user's profile, to see another user's friends, or to view pictures of another user. Likewise, becoming friends within a social networking system may allow a user greater access to communicate with another user, such as by email (internal and external to the social networking system), instant message, text message, phone, or any other communicative interface. In addition, becoming friends within a social networking system may allow a user greater ability communicate about another user, such as by tagging the other user in a content item uploaded by the tagging user or any other user, or by tagging the other user in an action, a group, or any other social networking system context. Finally, being friends may allow a user access to view, comment on, download, endorse or otherwise interact with another user's uploaded content items.

A social networking system may allow users to communicate both within and external to the social networking system. For example, a first user may send a second user a message within the social networking system, an email through the social networking system, an email external to but originating from the social networking system, an instant message within the social networking system, and an instant message external to but originating from the social networking system. Further, a first user may comment on the profile page of a second user, or may comment on objects associated with a second user, such as content items uploaded by the second user. In addition, a user may communicate by posting a note on the user's own profile. Finally, a user may communicate by sending a text/SMS message, a phone call or a voice message originating from or transmitted through the social networking to the mobile device of another user. For example, a first user may initiate a call to a second user through a voice over IP (VOIP) calling service provided by the social networking system, or may send a text/SMS message from the first's user mobile phone through the social networking system to the second user.

Users of a social networking system may receive communications from the social networking system on mobile devices. As discussed above, users may access the social networking system on the mobile device through, for instance, a mobile device web browser, an email or other messaging interface on the mobile device, or through a dedicated social networking system mobile device application. In one embodiment, the social networking system may send notifications to the user's mobile device. The notifications may notify a user that a second user has communicated with or has attempted to communicate with the user, may inform the user that the user has been tagged in an image or message, may inform the user that someone has requested to become friends with the user within the social networking system, or may inform the user of any other social networking activity related to the user.

The social networking system may transmit content items to the mobile device of a user. In one embodiment, a social networking system may transmit text, email or instant messages to a user's mobile device. Alternatively, the social networking system may transmit images, videos, documents, or event reminders to a user's mobile device. For example, a first user may use a desktop computer to send a second user an instant message, and the social networking system may transmit the instant message to the second user's mobile device. Likewise, the social networking system may transmit a voice call or a voice message to a user's mobile device.

The social networking system may transmit location communications to a user's mobile device. For example, a social networking system may determine the location of a user (using, for instance, the location-detection functionality of a user's mobile device), and may transmit the identity and location of friends of the user who are nearby, or may transmit advertisement or sale/special offer information to the user for nearby businesses. The social networking system may also transmit application information to a user's mobile device. For example, a user might use a mobile device application to look up nearby restaurants, and the social networking system may transmit restaurant information to the mobile device application's interface. Likewise, a first user may use a mobile device application to play a game with a second user, and the social networking system may transmit game information to the mobile device game's interface.

A user may customize the communications transmitted to the user's mobile device from a social networking system. In one embodiment, a user allows certain types of communications to the user's mobile device. For example, a user may allow a social networking system to transmit notifications to the user's mobile device, but not text/SMS messages or images. Likewise, a user may limit communications from the social networking system to the user's mobile device to communications related to certain other users. For example, a user may allow communications to the user's mobile device from or related to friends of the user, or a subset of the user's friends, such as the user's family members, but may block other communications.

Communications from a social networking system received by a mobile device may be displayed within a social networking system application, or may utilize other mobile device interface functionalities. For example, a text message sent via a social networking system to a user's mobile device may appear in the mobile device's SMS application. Likewise, calls made from or through the social networking system may be received by a mobile device's phone application. Finally, notifications of communications from a social networking system may be displayed in a mobile device's notification interface.

Users of a social networking system may transmit communications from mobile devices to the social networking system. As discussed above, such communications include messages, images, videos, location information, application information or any other information from a mobile device application, interface or functionality. For example, a user may send an email from a mobile device to the social networking system. Likewise, a user may use a mobile device to post a message on another user's profile or wall, or may send an instant message from the mobile device to another user. In one embodiment, a user may send a text/SMS message from a mobile device to a social networking system for delivery to another user. Likewise, a user may make a call another user through the social networking system. For example, a first user may use a mobile device to call a second user through a social networking system calling service.

A social networking system may allow a user to upload pictures. In one embodiment, the social networking system allows a user to upload pictures from the user's mobile device. For example, a user's mobile device may include camera functionality, allowing the user to take photographs with the mobile device. The mobile device may also allow a user to perform image editing on photographs, such as image cropping, brightness adjustment, and other image processing functions. A user may upload photographs from the user's mobile device to the social networking system. A mobile device may allow a user to tag other users in images by associating an image or a location within the image with the identity of a social networking system user. For example, a first user may take a photo of a second user with the first user's mobile device, the first user may tag the second user in the photo, and the first user may upload the tagged photo to the social networking system. Similarly, users may use mobile devices to create and upload videos, documents or any other type of content item to the social networking system.

A user may use a mobile device to create or schedule events within the social networking system. For example, a user may use a mobile phone's calendar functionality to schedule a meeting, may include details with the meeting, and may invite other people to the meeting. The user may then transmit the event from the mobile device to the social networking system. Likewise, a user may use a mobile device to RSVP to an event invitation, to edit event details, to reschedule an event, to cancel an event, or to respond to questions about the event. A user may use a mobile device application to transmit application communications to a social networking system. In the example of a game application discussed above, a user may play a game on a mobile device with another social networking system user, and the mobile device will transmit game-related information to the social networking system.

A user may use a mobile device's location-detection functionality to determine the present location of the mobile device. Location-detection functionality may be implemented with, for example, a GPS receiver implemented in a mobile device. Location-detection functionality allows a mobile device to determine the device's geographic location. For example, a mobile device with location-detection functionality may be able to determine the longitude and latitude coordinates of the device. Likewise, location-detection functionality may allow a mobile device to identify the mobile device's presence at a location or event entity, such as a restaurant or other place of business, a concert or other event, a park, a race, a city, or any other identifiable location or occurrence. In one embodiment, locations such as these have defined geographic coordinate ranges, and a mobile device cross-references these ranges with the geographic location of the mobile device to determine the mobile device's presence at these locations. Likewise, in one embodiment, events have defined geographic coordinate ranges for particular periods of time, and a mobile device cross-references the ranges and time periods with the mobile device's geographic location at a particular time to determine the device's presence at these occurrences. For example, if a basketball game is known to occur within 100 yards of geographic coordinate (X, Y) between 6:00 pm and 10:00 pm, a mobile device may determine the geographic coordinates of the mobile device and the current time, and may make a determination that the user of the mobile device is at the basketball game.

A user may transmit location information from the user's mobile device to the social networking system. In one embodiment, the mobile device's geographic coordinates are transmitted to the social networking system. In one embodiment, the mobile device's presence at a location or event is transmitted to the social networking system. The social networking system may receive geographic coordinates from a mobile device, and may cross-reference determined location and event coordinates and times to determine the mobile device's presence at a particular location or event. Using a mobile device to detect the mobile device's presence at a location or event and transmitting this presence to the social networking system, or transmitting geographic coordinates to the social networking system to let the social networking system determine the mobile device's presence at a location or event is referred to herein as "checking in" to a location or event.

A social networking system may display communications received from a mobile device. For example, if a user uses a mobile device posts a message to another user's wall, the message may be displayed on the user's wall to users who view the user's wall. Messages transmitted from mobile devices may be posted with an indication that a mobile device was used in posting the message. In one embodiment, email, text/SMS and instant messages may be displayed only to a particular intended recipient of the messages. Images uploaded to the social networking system using a mobile device may be automatically displayed on the user's profile, for instance on a user's wall or in image albums. In one embodiment, location information transmitted to the social networking system with a mobile device is displayed on the wall of the user of the mobile device indicating that the user of the mobile device checked in to a particular location.

Alternatively, information transmitted from a mobile device to a social networking system may be displayed only to the user of the mobile device. For example, images uploaded to the social networking system may not be displayed to other users, but are instead stored in private image albums for viewing, editing and subsequent posting by the user of the mobile device. Likewise, application information transmitted from a mobile device to the social networking system may be displayed only to the user of the mobile device. All communications transmitted from a mobile device to a social networking system may be stored in a social graph regardless of whether the transmitted communications are visible to the user of the mobile device or other users. A social graph organizes information related to social networking system objects and the interactions and relationships between social networking system object. Thus, while communications transmitted from a mobile device may not be displayed to users of a social networking system, the association between the communications and the user of the mobile device, as well as the association between the communications and any other social networking system object, may be stored within the social networking system's social graph.

FIG. 1 is a diagram illustrating the relative automatic transmission of communications in various mobile device operating modes, according to one embodiment. In the embodiment of FIG. 1, a mobile device has at least two operating modes: social mode 110 and manual mode 120. As illustrated, the set of automatic communication transmissions 100 between a mobile device and a social networking system while the mobile device is in social mode 110 is greater than the set of automatic communication transmissions 100 while the mobile device is in manual mode 120.

The automatic transmission of communications between a mobile device and a social networking system includes communications that are transmitted without the explicit authorization from the user of the mobile device. For example, a social networking system may transmit a notification to the user of a mobile device indicating that the user was tagged in a photograph by another user without a request for notifications by the user of the mobile device. Likewise, a mobile device may transmit the location of the mobile device to the social networking system any time a user uses a mobile device's location-detection functionality to determine the location of the mobile device. In another example, a photograph taken with a mobile device may be automatically transmitted to the social networking system.

Communications that are not automatically transmitted between a mobile device and a social networking system require manual authorization by the user of the mobile device. For example, if the automatic transmission of a communication is disabled, a user might have to explicitly request the transmission of the communication from the social networking system or may have to explicitly request the transmission of the communication to the social networking system. A user might explicitly request communications, such as notifications, from the social networking system by selecting a "notifications" button in a mobile device application. Likewise, a user may be required to approve the transmission of communications, such as location information, to the social networking system through the use of a pop-up button any time a user uses a location-detection application to determine the mobile device's location. Manually or explicitly requesting communications from the social networking system or requesting the transmission of communications to the social networking system is referred to herein as "authorizing" the communications.

In one embodiment, while the mobile device is in manual mode 120, automatic communications transmissions 100 are completely prevented. Alternatively, automatic communications transmissions 100 may be minimal while the mobile device is in manual mode 120. For example, automatic communications transmissions 100 may be limited to notifications from the social networking system to the mobile device while the mobile device is in manual mode 120. Likewise, the set of automatic communication transmissions 100 while the mobile device is in social mode 110 and the set of automatic communication transmissions 100 while the mobile device is in manual mode 120 may be very similar. For example, a mobile device in manual mode 120 may automatically transmit and receive all communications than the mobile device would transmit and receive while the mobile device was in social mode 110 except for the automatic transmission of location data from the mobile device to the social networking system. Thus, the sets of automatic communication transmissions 100 for a mobile device in social mode 110 and a mobile device in manual mode 120 may each include any number of automatic communication transmissions 100 as long as the manual mode 120 set is a subset of the social mode 110 set.

System Architecture

Figure 2:
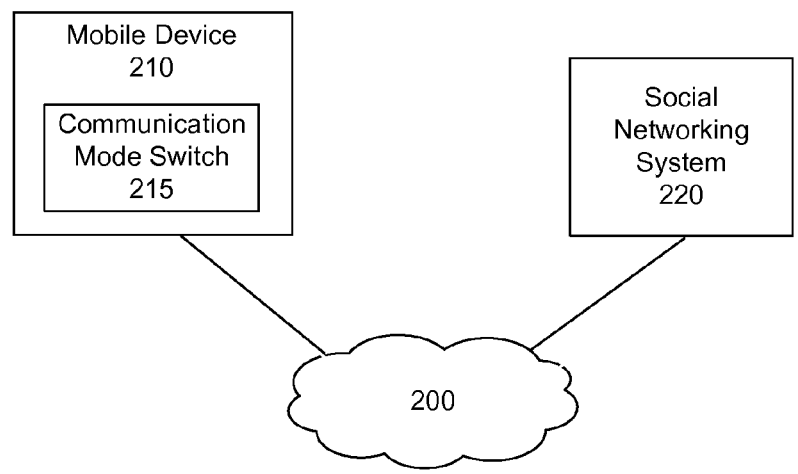
FIG. 2 is a high level block diagram of a system environment suitable for managing the transmission of communications between a mobile device and a social networking system, according to one embodiment.

FIG. 2 is a high level block diagram of a system environment suitable for managing the transmission of communications between a mobile device and a social networking system, according to one embodiment. The system environment includes a mobile device 210 and a social networking system 220 that communicate through a connecting network 200. The connecting network may be the Internet, a local area network, a wireless network, a cellular network, or any other network that allows communication between modules. The connecting network 200 may use standard communications technologies and/or protocols. In alternative configurations, different and/or additional modules can be included in the system. In addition, the connecting network 200 may include a combination of networks. For example, in the embodiment where the mobile device 210 is a mobile phone, the connecting network 200 may include a cellular phone wireless network which interfaces with the Internet, allowing the mobile phone to connect with a social networking system's web servers. The mobile device 210 includes a communication mode switch 215 which allows a user of the mobile device 210 to toggle between two or more communication modes.

Mobile device 210 may comprise any type of mobile computing device capable of sending or receiving communications to and from the social networking system 220, such as a mobile phone, laptop, netbook, or tablet, and including traditional non-mobile devices such as a desktop computer or a television. Although only one mobile device 210 is shown in FIG. 2, any number of mobile devices may be connected to and communicate with social networking system 220 at a time. A user of the mobile device 210 interacts with the social networking system 220 via an application, such as a web browser or a native application, or using other mobile device 210 communicative functionality, such as an text/SMS message service or location-detection service, to perform social networking system operations such as browsing content, posting and sending messages, establishing connections with other users, uploading pictures and other content items, and to transmit and receive any other communications to and from the social networking system 220.

The social networking system 220 may comprise a plurality of pages hosted on one or more web servers. The plurality of pages may present social networking system information. For example, these pages may include pages for user profiles, group profiles, fan pages, and other social networking system-related pages. These pages may include a variety of social networking system data, such as personal information, user settings, group settings, search results, and advertisements, as well as object and interaction data, including but not limited to user actions, profile information, relationship information, communication information, group information, fan page information, endorsement information, and content items.

Social networking system data, such as social graph data, is stored in one or more social networking system databases. These databases and all other social networking system components can communicate with the user device 210 via the connecting network 200 through the social networking system web servers. The databases may provide social networking system object data, interaction data or any other social networking system data when by requested by another social networking system component or the mobile device 210.

Operation

Figure 3:
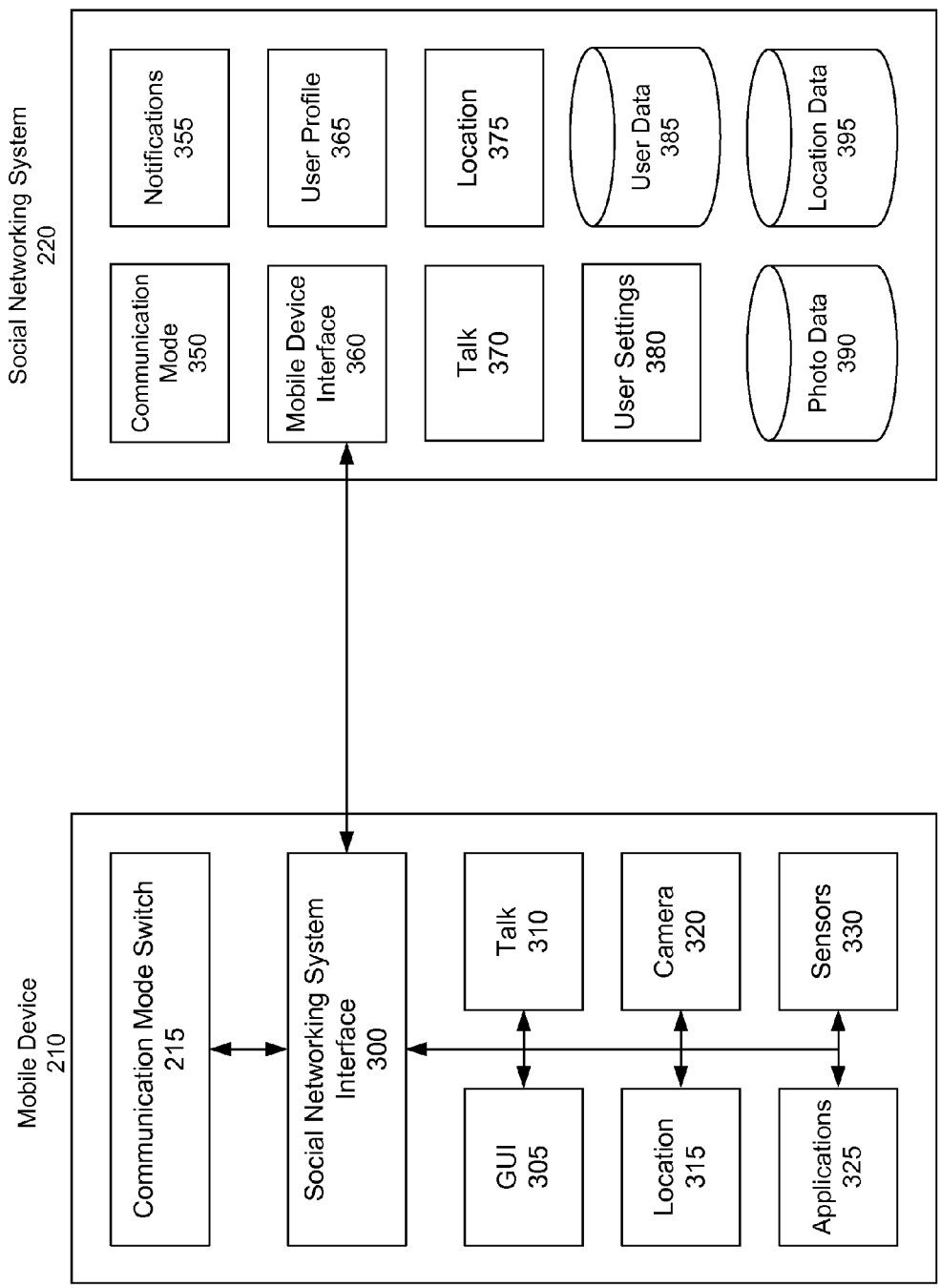
FIG. 3 is a block diagram illustrating one embodiment of the invention in which communications are transmitted between a mobile device and a social networking system according to the communication mode of the mobile device.

FIG. 3 is a block diagram illustrating one embodiment of the invention in which communications are transmitted between a mobile device and a social networking system according to the communication mode of the mobile device. In the embodiment of FIG. 3, the mobile device 210 includes a communication mode switch 215, a social networking system interface 300, a graphical user interface (GUI) 305, a talk module 310, a location module 315, a camera 320, an applications module 325, and a sensors module 330. In addition, the communications are transmitted between the mobile device 210 and the social networking system 220. Although not illustrated in FIG. 3, the communications are transmitted through the connecting network 200. The transmitted communications include all information transmitted between the mobile device 210 and the social networking system 220.

Social networking system 220 as illustrated in the embodiment of FIG. 3 includes a communication mode module 350, a notifications module 355, a mobile device interface 360, a user profile module 365, a talk module 370, a location module 375, a user settings module 380, a user data storage module 385, a photo data storage module 390 and a location data storage module 395. Both the mobile device 210 and the social networking system 220 may include fewer or additional components, and the functionalities of two or more components may be implemented by a single component.

The communication mode switch 215 of the mobile device 210 may be any type of switch that allows a user of the mobile device 210 to toggle between two or more communication modes. In one embodiment, the communication mode switch 215 is a physical switch. For example, the communication mode switch 215 may be a button that allows a user to toggle between communication modes when compressed. Likewise, the communication mode switch 215 may be a moveable switch protruding from the mobile device 210 that allows the user to toggle between communication modes by sliding or otherwise adjusting the physical position of the communication mode switch 215. In one embodiment, the communication mode switch 215 is a slideable switch that allows a user to slide the switch between two or more distinct positions, each position corresponding to a particular communication mode. Alternatively, the communications mode switch 215 may be a software switch that allows a user to toggle between communication modes. For example, the mobile device 210 may display a button on a mobile device display, and the user of the mobile device 210 may "press" the button by selecting it with an input device, such as a stylus or a finger on a touch-sensitive display, a mouse, or navigation physical buttons on the mobile device 210. Likewise, the communication mode switch 215 may be implemented through two or more displayed buttons (for instance, a drop-down list), with each button corresponding to a particular communication mode.

The social networking system interface 300 manages communications between the mobile device's components and the social networking system 220. The social networking system interface 300 receives communications from the social networking system 220 and routes the communications to the appropriate mobile device components. Likewise, the social networking system interface 300 receives communications from the mobile device components and transmits the communications to the social networking system 220. The social networking system interface 300 determines the communication mode of the mobile device 210 from the communication mode switch 215. In one embodiment, the social networking system interface 300 queries or detects the position of the communication mode switch 215 and determines the communication mode based on the detected position of the switch. Likewise, the social networking system interface 300 may determine the communication mode of the mobile device 210 by determining a user input received through a communication mode switch 215 implemented in software.

The mobile device 210 may transmit the communication mode of the mobile device 210 to the social networking system 220 via the social networking system interface 300 periodically. For example, the mobile device 210 may transmit a communication mode to the social networking system 220 every minute, every 10 minutes, or on any interval. Alternatively, the mobile device 210 may transmit the communication mode of the mobile device 210 to the social networking system 220 in response to receiving a request for the mobile device's communication mode from the social networking system 220, or in conjunction with each communication transmitted to the social networking system 220.

The GUI 305 is a mobile device interface displayed on the monitor or screen of the mobile device 210 which allows a user of the mobile device 210 to utilize the functionality of the mobile device 210 and the mobile device's components, as well as interact with the social networking system 220 through the mobile device 210. The GUI 305 may include a software interface capable of receiving user input, and allowing a user to select between the various functionalities of the mobile device 210. For example, the GUI 305 may allow a user to select to use a phone functionality of the mobile device 210, to select text/SMS message functionality, to select location-detection functionality, to select camera functionality, and to select between one or more mobile device applications. In one embodiment, a user of mobile device 210 may select a social networking system application using the GUI 305. The GUI 305 may display one or more icons on the mobile device display which allow the user of the mobile device 210 to select between the various mobile device functionalities. In one embodiment, the GUI 305 allows a user to manually authorize the transmission of communications to the social networking system 220. For example, if the social networking system interface 300 determines from the communication mode switch 215 that the mobile device is in manual mode, the social networking system interface 300 may prompt a user to authorize the transmission of a communication by displaying an authorization option on the mobile device display through the GUI 305.

The talk module 310 allows a user of a mobile device access to phone/VOIP call functionality, text/SMS messaging functionality, instant messaging functionality, email functionality and any other form of communicative functionality. A user of the mobile device 210 may access the communicative functionalities of the talk module 310 through the GUI module 305. A user makes a call or sends a message from the talk module 310, and the talk module 310 sends the call or message to the social networking system 220 through the social networking system interface 300. Likewise, a user receives a call or a message from the social networking system 220 through the social networking system interface 300 and at the talk module 310.

The location module 315 includes location-detection functionality and allows a user of the mobile device 210 to determine the mobile device's location. In one embodiment, the location module 315 includes a GPS receiver or other location-detection means. The location module 315 may allow a user to manually determine the mobile device's location, for instance through the use of a button or application displayed via the GUI 305. Alternatively, the location module 315 may automatically and/or continuously determine the mobile device's location 210. The location module 315 may detect the geographic coordinates of the mobile device 210 and/or the presence of the mobile device 210 at a particular entity, such a business, an event, or a location. The location module 315 may transmit location information to the social networking system 220 through the social networking system interface 300. Likewise, the location module 315 may receive location information, such as the location of friends of the user of the mobile device, from the social networking system 220 through the social networking system interface 300. In one embodiment, the location module 315 includes map functionality, and the mobile device's location is displayed to the user of the mobile device in conjunction with a map through the GUI 305.

The camera module 320 provides the user of the mobile device 210 camera functionality, allowing the user to take pictures or otherwise capture images. The camera module 320 may also allow a user the ability to record sound and/or video. Images, sound and video captured by the camera module 320 may be transmitted to the social networking system 220 through the social networking system interface 300.

The applications module 325 allows a user the ability to download and operate software applications on the mobile device 210. Applications may be any software-implemented functionality, including but not limited to social networking system applications, games, navigation and map applications, communicative or messaging applications, web browsing applications, word processing and other document-editing applications, image-editing applications, media applications, digital reader applications, calendar applications, or any other software applications. Applications may be run in stand-alone form or may run in the background of a mobile device. Applications module 325 may transmit communications to and may receive communications from the social networking system 220 via the social networking system interface 300.

The sensors module 330 contains hardware and software sensors that provide a user of the mobile device 210 with various functionalities. The sensors may interface with other mobile device components, such as the GUI 305, the location module 315 and the applications module 325. Examples of sensors contained within the sensors module 330 include an altimeter, a speedometer, an accelerometer, an optical sensor, a proximity sensor, a mood sensor, or any other sensor which can determine a particular context of the mobile device 210 or the user of the mobile device 210. The sensors module 330 may transmit sensor information to the social networking system 220 through the social networking system interface 300.

Turning to the social networking system 220, the client device interface 360 manages communications between the social networking system's components and the mobile device 210. The client device interface 360 receives communications from the mobile device 210 and routes the communications to the appropriate social networking system components. Likewise, the client device interface 360 receives communications from the social networking system components and transmits the communications to the mobile device 210.

The client device interface 360 transmits communications to the mobile device 210 based on the communication mode of the mobile device 210. In one embodiment, the client device interface 360 determines the communication mode of the mobile device 210. In this embodiment, the client device interface 360 may transmit a communication mode request to the mobile device 210. In response to this request, the mobile device 210, via the social networking system interface 300 and the communications mode switch 215, transmits the communication mode to the social networking system 220. The client device interface 360 may query the communication mode of the mobile device 210 periodically (for instance, once every 5 minutes), or may query the communication mode of the mobile device 210 before the client device interface 360 receives a communication for transmission to the mobile device 210 from one or more social networking system components 220. Likewise, as discussed above, the social networking system 220 may receive the communication mode from the mobile device 210 without requesting the communication mode. In one embodiment, received the communication modes of the mobile device 210 are stored in the communication mode module 350. In this embodiment, the client device interface 360 determines the communication mode of the mobile device 210 by retrieving the mobile device's stored communication mode from the communication mode module 350.

The notifications module 355 produces communications ("notifications") for transmission to the mobile device 210 via the client device interface 360. Notifications include information about social networking system activity related to the user of the mobile device 210. For example, a notification may inform a user that the user received a message through the social networking system 220, such as an email message or an instant message; that the another user posted on the user's wall or profile; that the user was invited to an event or invited to join a group; that the user was tagged in a content item, such as a picture or video; that another user commented on, liked or otherwise endorsed the user's wall posts, messages, or content items; that the user was invited to participate in or download an application; that another user requested to be friends with the user; that the user was tagged in or was asked a question by another user; or any other activity related to the user.

The user profile module 365 includes the functionality to display a user profile page for social networking system users including objects and information entered by or related to the user. The user profile may display biographical information about the user, user preference information, content items, or any other information related to or entered by the user. The user profile may include a "wall," which is a page or section within the user profile dedicated to displaying user activity and messages. In one embodiment, the user can enter information for display via the mobile device 210. For example, the user may post a message to the user's profile wall using the mobile device 210. Likewise, the user may take a photograph with the mobile device 210 and may upload the photograph to the user's wall. In another example, the user may use a mobile device's location-detection functionality to determine the mobile device's location, and may post this information to the user's profile. Information entered in, received at or displayed on a user's profile is stored in user data storage module 385. Likewise, photographs displayed on a user's profile or otherwise uploaded to the social networking system 220 are stored in photo data storage module 390.

The talk module 370 provides users of the social networking system 220 with the functionality to make or receive phone/VOIP calls, to send or receive text/SMS messages, to send or receive instant messages, to send or receive emails, or any other form of communication through the social networking system 220. In addition, the talk module 370 manages the receipt and transmission of communications to and from a social networking system user. When a user receives a call or message through the social networking system 220, the talk module 370 may transmit the call or message to the mobile device 210 of the user through the client device interface 360. Likewise, when the user of the mobile device 210 transmits a call or a message through the social networking system 220, the talk module 370 receives the call or message via the client device interface 360 and routes the call or message to the intended recipient of the message. For example, the talk module 370 may receive an instant message from a first user, and may transmit the instant message to the mobile device 210 of the second user. If the second user responds with an email message to the first user, the mobile device 210 transmits the email to social networking system 220 and the talk module 370 routes the email to the first user. Information and data related to calls, messages and other communications received at or sent from the social networking system 220 may be stored in the message data storage module 385.

The location module 375 receives and maintains location information from social networking system users. In one embodiment, a user transmits location information to the social networking system 220, and the location module 375 receives the location information from the client device interface 360. The location module 375 may display a user's location information on the user's profile page using the user profile module 365. For example, a user may check in to a restaurant using a mobile device 210 with location-detection functionality, and the location module 375 may display text indicating that the user checked in to the restaurant and the time that the user checked in to the restaurant. Location information is stored in location data storage module 395. The location module 375 may also receive location information from other social networking system users, and may provide all or a subset of this information to the user of the mobile device 210. In one embodiment, the social networking system 220 notifies (using, for example, notifications module 355) a first user of the mobile device 210 that a second user is nearby based on location information received for the first user. For example, if a first user checks in at a bar, and a second user checks in at an ice cream shop a block away, the social networking system 220 may notify each user of the location of each other.

The user settings module 380 allows a user to adjust a number of social networking system parameters. In one embodiment, the user settings module 380 allows a user to customize the automatic transmission of communications in particular communication modes. For example, a user may specify particular communications for automatic transmission between the mobile device 210 and the social networking system 220 when the mobile device 210 is in the manual mode that otherwise would not be automatically transmitted. Likewise, a user may prevent particular communications from being automatically transmitted when the mobile device 210 is in the social mode that otherwise would be automatically transmitted. In one embodiment, the user settings module 380 allows a user to customize the automatic transmission of communications based on the type of communications and the users related to the communications. For example, a user may specify that email messages from family members are always automatically transmitted from the social networking system 220 to the mobile device 210 regardless of the communication mode of the mobile device 210. Likewise, a user may specify that location information indicating that a particular set of friends is nearby is always automatically transmitted to the mobile device 210. Alternatively, a user may specify that application data or messages from non-friends are never to be automatically transmitted to the mobile device 210. User settings may be stored in the user data storage module 385. In one embodiment, a user may not customize the automatic transmission of communications between a mobile device 210 and a social networking system 220.

Social and Manual Modes

When the mobile device 210 is in a first communication mode (referred to herein as the "social mode"), the social networking system 220 may transmit some or all communications (such as notifications and messages) to the mobile device 210 automatically, without the explicit authorization or request from the user of the mobile device 210. Similarly, when the mobile device 210 is in the social mode, the mobile device 210 may transmit some or all communications (such as photographs taken by the mobile device and location information) automatically to the social networking system 220 without the explicit authorization or request from the user of the mobile device 210. In the event that the mobile device 210 has communications to automatically transmit to the social networking system 220, but does not have access to the connecting network 200, the mobile device 210 may store the communications in a queue for when the connecting network 200 is available to the mobile device 210.

When the mobile device 210 is in a second communication mode (referred to herein as the "manual mode"), the social networking system 220 may not transmit some or all communications to the mobile device 210 automatically, without the explicit authorization or request from the user of the mobile device. Similarly, when the mobile device 210 is in the manual mode, the mobile device 210 may not transmit some or all communications automatically without the explicit authorization or request from the user of the mobile device 210.

In the social mode, a social networking system 220 may automatically transmit all notifications to the mobile device 210. Likewise, in the manual mode, a social networking system 220 may transmit notifications to the mobile device 210 only at the explicit request of the user of the mobile device 210. In one embodiment, even if the mobile device 210 is in the manual mode, the social networking system 220 may transmit a subset of notifications automatically. For example, if a mobile device 210 is in the manual mode, the social networking system 220 may still transmit notifications of messages sent to the user of the mobile device 210 from friends of the user, or the social networking system 220 may transmit notifications of events or calendar entries to the user.

The transmission of calls and other messages (such as text/SMS messages, emails, instant messages, wall posts, and other messages) may vary based upon the communication mode of the mobile device 210. In the social mode, all calls and messages may be transmitted from the social networking system 220 to the mobile device 210. Alternatively, even in the social mode, some messages may not be transmitted by the social networking system 220. For example, instant messages may be transmitted by the social networking system 220 only if the mobile device is running an instant messaging application.

In the manual mode, a social networking system 220 may transmit messages only at the explicit request of the user of the mobile device 210. For example, if a mobile device 210 is in the manual mode, email messages may be transmitted by the social networking system 220 to the mobile device 210 only if the user of the mobile device 210 launches an email application. In one embodiment, calls are not transmitted by the social networking system 220 to the mobile device 210 if the mobile device 210 is in the manual mode. In this embodiment, callers attempting to call the user of the mobile device 210 may instead be directed to the user's voicemail account. In one embodiment, even if the mobile device 210 is in the manual mode, calls are still transmitted by the social networking system 220 to the mobile device 210.

When the mobile device 210 is in the social mode, location information may be automatically transmitted to the social networking system 220. For example, a mobile device 210 with location-detection functionality in the social mode may automatically and continuously determine the location of the mobile device, may automatically check-in to locations or events, may automatically prompt a user to check-in to locations or events, and may automatically transmit location information and check-in information to the social networking system 220. In addition, when the mobile device 210 is in the social mode, the social networking system 220 may automatically transmit notifications of nearby users. For example, if a mobile device 210 is in the social mode, the social networking system 220 may transmit the names and locations of all friends of the user of the mobile 210 based on the location information received from the mobile device 210. In one embodiment, if the mobile device 210 is in the social mode, the social networking system 220 may automatically transmit information to the mobile device 210 about nearby businesses, events or other entities. For example, if a mobile device 210 is in the social mode, the social networking system 220 may transmit information to the mobile device 210 including special offers or advertisements from nearby business. Alternatively, the social networking system 220 may transmit information to the mobile device 210 about nearby events.

When the mobile device 210 is in the manual mode, location information may not be automatically transmitted to the social networking system 220. In one embodiment, a user of a mobile device 210 in manual mode must explicitly enable the mobile device's location-detection functionality to determine the location of the mobile device 210. Likewise, in one embodiment, the user of the mobile device 210 must explicitly check-in to a location or entity. In one embodiment, even if the mobile device 210 is in manual mode, if the user of the mobile device 210 explicitly determines the location of the mobile device 210, the mobile device 210 automatically checks-in to an applicable location or entity. When the mobile device 210 is in the manual mode, the user of the mobile device 210 may be required to explicitly request location information from the social networking system 220 prior to receiving transmitted location information from the social networking system 220. For example, the user of a mobile device 210 in manual mode may be required to request the location of nearby friends or request special offers from nearby restaurants prior to the social networking system 220 transmitted such information to the mobile device 210. In one embodiment, if the mobile device 210 is in manual mode and the user of the mobile device 210 manually transmits location information to the social networking system 220, the social networking system 220 does not use the location information for any purpose outside of what the user of the mobile device 210 manually permits.

In the social mode, photographs or videos may be automatically transmitted to the social networking system 220 after they are taken by the mobile device 210 without the explicit authorization or request of the user of the mobile device 210. In one embodiment, if the mobile device 210 is in the social mode, the photographs or videos transmitted to the social networking system are displayed on the wall or profile of the user of the mobile device 210. Alternatively, photographs and videos transmitted from the mobile device 210 to the social networking system 220 in the social mode may be displayed only to the user of the mobile device 210. In such an embodiment, the user may subsequently review, edit, and/or display the photographs and videos on the user's wall, profile, or any other location.

In the manual mode, photographs or videos taken by the mobile device 210 are transmitted to the social networking system 220 only with the explicit authorization by or request of the user of the mobile device 210. For example, if a user takes a photograph with a mobile device 210, the photograph will only be transmitted to the social networking system 220 if the user selects an option to transmit the photograph to the social networking system 220. Alternatively, even in the manual mode, photographs and videos may be automatically transmitted to the social networking system 220 but not displayed on the social networking system 220 to any users but the user of the mobile device 210. For example, if a user records a video with a mobile device 210, the video may be automatically transmitted to the social networking system 220 even if the mobile device 210 is in the manual mode, but only the user has the ability to view the video.

When the mobile device 210 is in the social mode, sensor information may be transmitted to the social networking system 220 automatically, without the explicit authorization or request of the user of the mobile device 210. For example, a mobile device 210 may automatically transmit to a social networking system 220 altitude information from an altimeter, speed or velocity information from a speedometer, acceleration or position information from an accelerometer, optical information from an optical sensor, proximity information from a proximity sensor, mood information from a mood sensor, or any other sensor-related information. Likewise, when the mobile device 210 is in the manual mode, sensor information may be transmitted to the social networking system 220 only with the explicit authorization or at the request of the user of the mobile device 210.

When the mobile device 210 is in the social mode, information related to applications or application use may be automatically transmitted to the social networking system 220, without the explicit authorization or request of the user of the mobile device 210. For example, for a media-player application, information related to the media currently being played on a user's mobile device 210 using the media-player application may be transmitted to the social networking system automatically. In one embodiment, information related to applications or application use transmitted to the social networking system 220 is displayed on the wall or profile of the user of the mobile device 210. Likewise, in the social mode, information related to applications or application use may be automatically transmitted from the social networking system 220 to the mobile device 210. For example, a user of a mobile device 210 in social mode may be able to receive the titles of media being played in a media-player application by friends of the user. In one embodiment, when the mobile device 210 is in the manual mode, information related to applications or application use is not automatically transmitted between the mobile device 210 and the social networking system 220. Alternatively, even in the manual mode, some information related to applications or application use is automatically transmitted between the mobile device 210 and the social networking system 220. For example, if a user of a mobile device 210 is playing a game with a friend, a user may automatically be notified that it is the user's turn in the game, regardless of whether the mobile device 210 of the user is in the manual mode.

In one embodiment, the mobile device 210 has three communication modes. In one embodiment, the mobile device 210 has a social mode, a manual mode, and a third communication mode. In this embodiment, the third communication mode may completely restrict communications from being transmitted between the social networking system 220 and the mobile device 210. Alternatively, the third communication mode may completely allow all communications to be automatically transmitted between the social networking system 220 and the mobile device 210. In one embodiment, the third communication mode may allow more communications to be automatically transmitted between the mobile device 210 and the social networking system 220 than the manual mode but fewer than the social mode.

In one embodiment, a user's mobile device communication mode may be displayed to other users of the social networking system 220. Displaying a device's communication mode may include displaying which types of communications will be automatically transmitted to the user of the mobile device 210. In addition, a mobile device's communication mode may be displayed within a social networking system 220 interface. For example, if a mobile device 210 is set to allow all phone calls and text/SMS messages to be automatically transmitted to the mobile device 210, the profile page of the user of the mobile device 210 may display these channels of communication to a viewer of the profile page. Alternatively, if a user of the social networking system 220 attempts to contact the user of the mobile device 210 using a communication channel not set to be automatically transmitted to the mobile device 210, the social networking system 220 may prompt the user to contact the user of the mobile device 210 using a communication channel that is set to be automatically transmitted to the mobile device 210.

Figure 4:
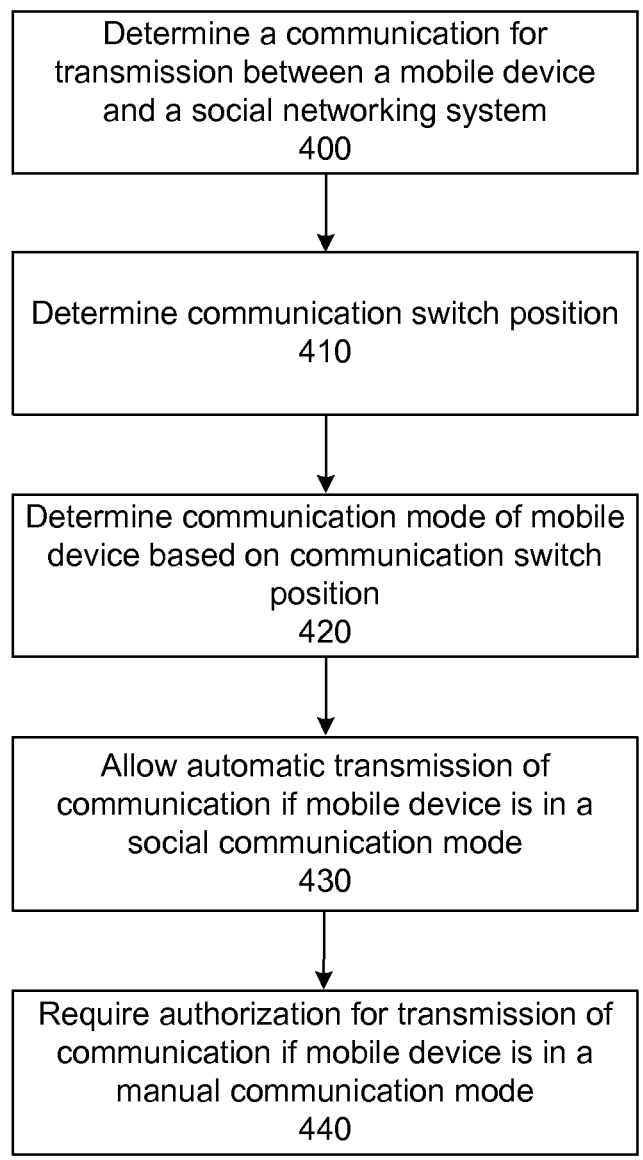
FIG. 4 is a flow chart illustrating a process for managing the transmission of communications between a social networking system and a mobile device, according to one embodiment.

FIG. 4 is a flow chart illustrating a process for managing the transmission of communications between a social networking system and a mobile device, according to one embodiment. A communication for transmission between a mobile device and a social networking system is determined 400. As discussed above, the communication may be any information transmitted between the mobile device and the social networking system. A communication switch position is determined 410. For example, the communication switch may be in one of two or more positions.

The communication mode of the mobile device is determined 420 based on the communication switch position. For example, a first communication mode may correspond to a first communication switch position, and a second communication mode may correspond to a second communication switch position. If the mobile device is in a social communication mode, allow 430 the automatic transmission of the determined communication between the mobile device and the social networking system. If the mobile device is in a manual communication mode, require 440 authorization for the transmission of the determined communication between the mobile device and the social networking system. In one embodiment, authorization for the transmission of communications includes the selection of a transmission option by the user of the mobile device within the mobile device interface.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   detecting a location by a mobile device associated with a user account maintained by a social networking system, the detected location comprising a set of geographic coordinates obtained by the mobile device;
   determining a presence of the mobile device within fixed geographic ranges corresponding to a plurality of location entities by cross-referencing the geographic coordinates obtained by the mobile device with the fixed geographic ranges;
   receiving a selection of one of the plurality of location entities;
   generating a communication for transmission from the mobile device to the social networking system, the communication containing information about the selected location entity;
   sensing a mobile device communication switch position;
   determining the communication mode of the mobile device based on the communication switch position of the mobile device, wherein the mobile device is in a social communication mode if the communication switch is in a first position and wherein the mobile device is in a manual communication mode if the communication switch is in a second position;
   responsive to a determination that the mobile device is in the social communication mode:
      transmitting the generated communication from the mobile device to the social networking system without receiving additional authorization from a user of the mobile device; and
   responsive to a determination that the mobile device is in the manual communication mode:
      receiving an authorization for the transmission of the generated communication from the user of the mobile device, and
      transmitting the generated communication from the mobile device to the social networking system based on the received authorization,
   wherein the social networking system is configured to store the detected communication received from the mobile device in connection with the user account.

2. The method of claim 1, further comprising:
   detecting an action performed by the user of the mobile device;
   wherein the generated communication further contains information about the detected action.

3. The method of claim 2, wherein the performed action comprises a capturing of an image by the mobile device.

4. The method of claim 1, wherein the generated communication comprises one of: an email message, a text message, an SMS message, or an instant message.

5. The method of claim 1, wherein the generated communication comprises a phone call.

6. The method of claim 1, wherein the generated communication comprises one of: a wall post, a comment, an endorsement, a recommendation, a shared content item, or a tag.

7. The method of claim 1, wherein the generated communication comprises a notification of a social networking system activity related to or involving the user of the mobile device.

8. The method of claim 1, wherein the generated communication comprises a check-in at the selected location entity.

9. The method of claim 1, wherein the information about the selected location entity comprises the location of one or more social networking system users associated with the user of the mobile device in proximity with the user of the mobile device.

10. The method of claim 1, wherein the information about the selected location entity comprises advertisements for businesses in proximity with the user of the mobile device.

11. The method of claim 1, wherein the generated communication further comprises information related to an application on the mobile device.

12. The method of claim 1, wherein the generated communication comprises one or more images captured by the mobile device.

13. The method of claim 1, wherein the generated communication comprises one or more videos recorded by the mobile device.

14. The method of claim 1, wherein the communication switch of the mobile device can be in one of three or more positions.

15. The method of claim 1, wherein the communication switch of the mobile device is a hardware switch protruding from the mobile device.

16. The method of claim 1, wherein the mobile device is in an intermediate communication mode if the communication switch is in a third position, and further comprising:
   generating a second communication for transmission between the mobile device and a social networking system; and
   responsive to a determination that the mobile device is in the intermediate communication mode:
      transmitting the generated communication between the mobile device and the social networking system,
      receiving an authorization for the transmission of the generated second communication from a user of the mobile device, and
      transmitting the generated second communication between the mobile device and the social networking system based on the received authorization.

17. The method of claim 1, wherein the transmitted communication is displayed on a user profile of the user of the mobile device.

18. The method of claim 1, wherein the communication mode of the mobile device of the user is displayed to other social networking system users within the context of the social networking system.

19. The method of claim 1, wherein the transmitted communication is displayed on a user profile of the user of the mobile device.

20. The method of claim 1, further comprising receiving an input from the user to configure the transmission of communications between a mobile device and a social networking system based on the communication mode of the mobile device.

21. The method of claim 20, wherein configuring the transmission of communications comprises preventing the transmission of the generated communication when the mobile device is in the social mode.

22. The method of claim 20, wherein configuring the transmission of communications comprises allowing the transmission of the generated communication without receiving authorization for the transmission when the mobile device is in the manual mode.

23. The method of claim 1, further comprising receiving an input from the user to configure the transmission of communications between a mobile device and a social networking system based on communication type.

24. The method of claim 1, further comprising receiving an input from the user to configure the transmission of communications between a mobile device and a social networking system based on the identity of social networking system users associated with each communication.

25. The method of claim 1, wherein receiving an authorization comprises receiving a selection of an authorization option within an interface of the mobile device from the user of the mobile device.

26. A method for regulating the transmission of communications with a mobile device, the method comprising:
- detecting a location by the mobile device associated with a user account maintained by a social networking system, the detected location comprising a set of geographic coordinates obtained by the mobile device;
- determining a presence of the mobile device within fixed geographic ranges corresponding to a plurality of location entities by cross-referencing the geographic coordinates obtained by the mobile device with the fixed geographic ranges;
- receiving a selection of one of the plurality of location entities;
- generating a communication for transmission from the mobile device to the social networking system, the communication containing information about the selected location entity;
- determining a communication mode of the mobile device based on a communication switch setting;
- a step for determining whether to automatically transmit the generated communication based on the determined communication mode of the mobile device; and
- responsive to a determination to automatically transmit the generated communication:
  - transmitting the generated communication from the mobile device to the social networking system without receiving additional authorization from a user of the mobile device.

27. A system, comprising:
- a processor;
- a non-transitory memory including instructions, which when executed by the processor cause the processor to perform steps including:
  - detecting a location by a mobile device associated with a user account maintained by a social networking system, the detected location comprising a set of geographic coordinates obtained by the mobile device;
  - determining a presence of the mobile device within fixed geographic ranges corresponding to a plurality of location entities by cross-referencing the geographic coordinates obtained by the mobile device with the fixed geographic ranges;
  - receiving a selection of one of the plurality of location entities;
  - generating a communication for transmission from the mobile device to the social networking system, the communication containing information about the selected location entity;
  - sensing a mobile device communication switch position;
  - determining the communication mode of the mobile device based on the communication switch position of the mobile device, wherein the mobile device is in a social communication mode if the communication switch is in a first position and wherein the mobile device is in a manual communication mode if the communication switch is in a second position;
  - responsive to a determination that the mobile device is in the social communication mode:
    - transmitting the generated communication from the mobile device to the social networking system without receiving additional authorization from a user of the mobile device; and
  - responsive to a determination that the mobile device is in the manual communication mode:
    - receiving an authorization for the transmission of the generated communication from the user of the mobile device, and
    - transmitting the generated communication from the mobile device to the social networking system based on the received authorization,
  - wherein the social networking system is configured to store the detected communication received from the mobile device in connection with the user account.

28. A computer program product comprising a non-transitory computer-readable storage medium having instructions encoded thereon that, when executed by a processor, cause the processor to:
- detect a location by a mobile device associated with a user account maintained by a social networking system, the detected location comprising a set of geographic coordinates obtained by the mobile device;
- determine a presence of the mobile device within fixed geographic ranges corresponding to a plurality of location entities by cross-referencing the geographic coordinates obtained by the mobile device with the fixed geographic ranges;
- receive a selection of one of the plurality of location entities;
- generate a communication for transmission from the mobile device to the social networking system, the communication containing information about the selected location entity;
- sense a mobile device communication switch position;
- determine the communication mode of the mobile device based on the communication switch position of the mobile device, wherein the mobile device is in a social communication mode if the communication switch is in a first position and wherein the mobile device is in a manual communication mode if the communication switch is in a second position;
responsive to a determination that the mobile device is in the social communication mode:
  transmit the generated communication from the mobile device to the social networking system without receiving additional authorization from a user of the mobile device; and
responsive to a determination that the mobile device is in the manual communication mode:
  receive an authorization for the transmission of the generated communication from the user of the mobile device, and
  transmit the generated communication from the mobile device to the social networking system based on the received authorization,
wherein the social networking system is configured to store the detected communication received from the mobile device in connection with the user account.

* * * * *

UNITED STATES PATENT AND TRADEMARK OFFICE
CERTIFICATE OF CORRECTION

PATENT NO. : 9,912,772 B2  
APPLICATION NO. : 14/506604  
DATED : March 6, 2018  
INVENTOR(S) : Mary Graham et al.

Page 1 of 1

It is certified that error appears in the above-identified patent and that said Letters Patent is hereby corrected as shown below:

In the Claims

Column 19, Line 44, after "determining" delete "the" and insert -- a --.  
Column 21, Line 10, after "between" delete "a" and insert -- the --.  
Column 21, Line 10, after "device and" delete "a" and insert -- the --.  
Column 21, Line 24, after "between" delete "a" and insert -- the --.  
Column 21, Line 24, after "device and" delete "a" and insert -- the --.  
Column 21, Line 28, after "between" delete "a" and insert -- the --.  
Column 21, Line 28, after "device and" delete "a" and insert -- the --.  
Column 22, Line 19, after "determining" delete "the" and insert -- a --.  
Column 22, Line 22, after "determining" delete "the" and insert -- a --.

Signed and Sealed this  
Thirtieth Day of October, 2018

Andrei Iancu  
*Director of the United States Patent and Trademark Office*